United States Patent
Li et al.

(10) Patent No.: US 12,237,897 B2
(45) Date of Patent: Feb. 25, 2025

(54) CHANNEL STATE INFORMATION PROCESSING METHOD AND APPARATUS, AND CHANNEL STATE INFORMATION RECEIVING METHOD AND APPARATUS

(71) Applicant: ZTE Corporation, Shenzhen (CN)

(72) Inventors: Yong Li, Shenzhen (CN); Hao Wu, Shenzhen (CN); Guozeng Zheng, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 91 days.

(21) Appl. No.: 17/632,814

(22) PCT Filed: Aug. 13, 2020

(86) PCT No.: PCT/CN2020/108879
§ 371 (c)(1),
(2) Date: Feb. 4, 2022

(87) PCT Pub. No.: WO2021/027868
PCT Pub. Date: Feb. 18, 2021

(65) Prior Publication Data
US 2022/0321187 A1    Oct. 6, 2022

(30) Foreign Application Priority Data

Aug. 14, 2019 (CN) .......................... 201910750043.4

(51) Int. Cl.
    *H04B 7/06* (2006.01)
(52) U.S. Cl.
    CPC .................. *H04B 7/0626* (2013.01)
(58) Field of Classification Search
    CPC ... H04B 7/00; H04B 7/04; H04B 7/06; H04B 7/0456; H04B 7/0626; H04B 17/00;
    (Continued)

(56) References Cited

U.S. PATENT DOCUMENTS

2013/0286964 A1* 10/2013 Chu .................. H04L 27/261
                                                  370/329
2015/0327246 A1   11/2015 Kim et al.
(Continued)

FOREIGN PATENT DOCUMENTS

CA        3045400 A1    7/2019
CN      103339873 A    10/2013
(Continued)

OTHER PUBLICATIONS

International Search Report for corresponding application PCT/CN2020/108879 filed Aug. 13, 2020; Mail date Nov. 13, 2020.
(Continued)

*Primary Examiner* — Shawkat M Ali
(74) *Attorney, Agent, or Firm* — CANTOR COLBURN LLP (57) ABSTRACT

A channel state information processing method and apparatus, and a channel state information receiving method and apparatus are provided. The channel state information processing method includes that: a second communication node receives configuration information sent by a first communication node, wherein the configuration information at least includes: a target frequency band used for indicating channel state information; the second communication node determines a first target frequency band and generates first channel state information corresponding to the first target frequency band according to the configuration information, wherein the first channel state information includes precoding matrix information; and the second communication node feeds back the first channel state information to the first communication node.

19 Claims, 4 Drawing Sheets

(58) Field of Classification Search
CPC ......... H04B 17/24; H04B 17/345; H04L 1/00; H04L 1/06; H04L 1/16; H04L 5/00; H04L 25/02; H04W 4/10; H04W 24/00; H04W 24/10; H04W 72/04; H04W 72/12; H04W 74/08
USPC ........ 370/252; 375/219, 260, 262, 267, 295, 375/316; 455/509
See application file for complete search history.

(56) References Cited

U.S. PATENT DOCUMENTS

| | | | |
|---|---|---|---|
| 2017/0026953 A1* | 1/2017 | Wang | H04B 7/066 |
| 2017/0126300 A1 | 5/2017 | Park | |
| 2019/0222354 A1* | 7/2019 | Han | H04L 5/0048 |
| 2019/0379514 A1* | 12/2019 | Lee | H04B 7/0478 |

FOREIGN PATENT DOCUMENTS

| | | |
|---|---|---|
| CN | 104995857 A | 10/2015 |
| CN | 107404344 A | 11/2017 |
| CN | 108601084 A | 9/2018 |
| CN | 110535509 A | 12/2019 |
| CN | 111082841 A | 4/2020 |
| WO | 2018201456 A1 | 11/2018 |

OTHER PUBLICATIONS

Ericsson, "On Partial Bands and CSI Acquisition", 3GPP TSG-RAN WGI #90, Prague Czech Republic, Aug. 21-25, 2017, R1-1714287.
European Search Report for corresponding application EP20853393; Mail date Sep. 19, 2022.

* cited by examiner

CHANNEL STATE INFORMATION PROCESSING METHOD AND APPARATUS, AND CHANNEL STATE INFORMATION RECEIVING METHOD AND APPARATUS

CROSS-REFERENCE TO RELATED APPLICATION

The application is a Nation Stage Filing of PCT Application No. PCT/CN2020/108879 filed on Aug. 13, 2020, which claims priority to China Patent Application No. 201910750043.4, filed to the China National Intellectual Property Administration on Aug. 14, 2019, the disclosure of which is hereby incorporated by reference in its entirety.

TECHNICAL FIELD

The present disclosure relates to the field of communications, for example, to a channel state information processing method and apparatus, and a channel state information receiving method and apparatus.

BACKGROUND

Figure 1:
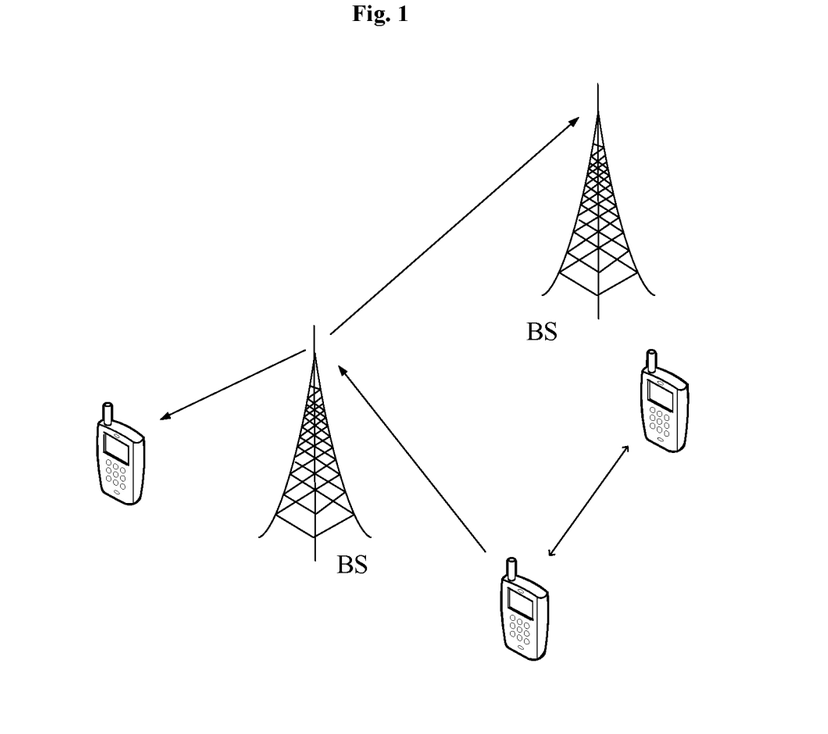
FIG. 1 is a schematic diagram of a wireless communication scenario in the related art.

Wireless communication technologies have a great impact on production and life. FIG. 1 is a schematic diagram of a wireless communication scenario in the related art. As shown in FIG. 1, in the related art, network side devices, such as a base station, can communicate wirelessly with other base stations. Moreover, the network side devices can also communicate wirelessly with associated User Equipment (UE). In addition, direct wireless communication can also be carried out between different UE. However, with the increasing amount of data in wireless communication, the communication efficiency of wireless communication is getting lower and lower.

SUMMARY

Embodiments of the present disclosure provide a channel state information processing method and apparatus, and a channel state information receiving method and apparatus, which can at least solve the problem in the related art of low communication efficiency caused by the increasing amount of data in wireless communication.

According to an embodiment of the present disclosure, a channel state information processing method is provided, which includes that: a second communication node receives configuration information sent by a first communication node, wherein the configuration information at least includes: a target frequency band used for indicating channel state information; the second communication node determines a first target frequency band and generates first channel state information corresponding to the first target frequency band according to the configuration information, wherein the first channel state information includes precoding matrix information; and the second communication node feeds back the first channel state information to the first communication node.

According to another embodiment of the present disclosure, a channel state information receiving method is provided, which includes that: a first communication node sends configuration information to a second communication node, wherein the configuration information at least includes: a target frequency band used for indicating channel state information, the configuration information is used for instructing the second communication node to determine a first target frequency band and generate first channel state information corresponding to the first target frequency band, and the first channel state information includes precoding matrix information; and the first communication node receives the first channel state information fed back by the second communication node.

According to another embodiment of the present disclosure, a channel state information processing apparatus is provided, which is located in the second communication node, and includes: a first receiving module, configured to receive configuration information sent by a first communication node, wherein the configuration information at least includes: a target frequency band used for indicating the channel state information; a processing module, configured to determine a first target frequency band and generate first channel state information corresponding to the first target frequency band according to the configuration information, wherein the first channel state information includes precoding matrix information; and a first sending module, configured to feed back the first channel state information to the first communication node.

According to another embodiment of the present disclosure, a channel state information receiving apparatus is provided, which is located in the first communication node, and includes: a second sending module, configured to send configuration information to a second communication node, wherein the configuration information at least includes: a target frequency band used for indicating channel state information, the configuration information is used for instructing the second communication node to determine a first target frequency band and generate first channel state information corresponding to the first target frequency band, and the first channel state information includes precoding matrix information; and a second receiving module, configured to receive the first channel state information fed back by the second communication node.

According to yet another embodiment of the present disclosure, a storage medium is also provided, in which a computer program is stored. The computer program is configured to execute, when running, the operations in any above method embodiment.

According to yet another embodiment of the present disclosure, an electronic device is also provided, which includes a memory and a processor. The memory stores a computer program. The processor is configured to run the computer program to execute the operations in any above method embodiment.

Through the embodiments of the present disclosure, because a dedicated frequency band is allocated to the precoding matrix information in channel state information of a node in wireless communication, so that the precoding matrix information is distinguished from other channel state information, the problem of low communication efficiency caused by the increasing amount of data in the wireless communication can be solved, and the beneficial effect of improving the efficiency of wireless communication is achieved.

DETAILED DESCRIPTION

The disclosure is elaborated below with reference to the accompanying drawings and embodiments. It is to be noted that the embodiments in the present application and characteristics in the embodiments may be combined without conflicts.

It is to be noted that the terms like "first" and "second" in the specification, claims and accompanying drawings of the disclosure are used for differentiating the similar objects, but do not have to describe a specific order or a sequence.

Between two communication nodes of wireless communication, a first communication node transmits a signal to a second communication node, the second communication node feeds back channel state information to the first communication node, and the first communication node determines a transmission scheme according to the received channel state information, so as to improve the transmission efficiency. As shown in FIG. 1, for example, a base station transmits a signal to a terminal, and the terminal feeds back channel state information to the base station. For another example, a first base station transmits a signal to a second base station, and the second base station feeds back channel state information to the first base station. For another example, a first terminal transmits a signal to a second terminal, and the second terminal feeds back channel state information to the first terminal.

In wireless communication, the first communication node transmits signals of multiple layers to the second communication node by the way of space division multiplexing, which improves the communication efficiency. The first communication node maps the signal to an antenna port through a precoding matrix to transmit the signals of multiple layers. In this way, the signals of each layer transmitted respectively correspond to vectors of each column in the precoding matrix. One of the special cases is that the first communication node transmits a layer of signals to the second communication node. The first communication node determines a transmission scheme of space division multiplexing according to the received channel state information fed back by the second communication node. The channel state information fed back by the second communication node includes precoding matrix information.

Embodiment 1

Figure 2:
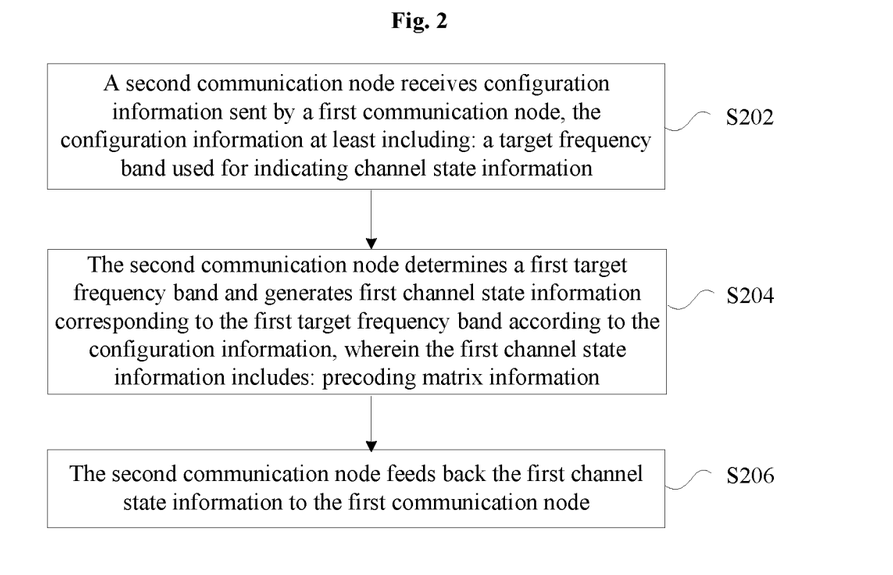
FIG. 2 is a flowchart of a channel state information processing method according to an embodiment of the present disclosure.

A channel state information processing method is provided in the present embodiment. FIG. 2 is a flowchart of a channel state information processing method according to an embodiment of the present disclosure. As shown in FIG. 2, the flow may include the following operations.

At S202, a second communication node receives configuration information sent by a first communication node, wherein the configuration information at least includes: a target frequency band used for indicating channel state information.

At S204, the second communication node determines a first target frequency band and generates first channel state information corresponding to the first target frequency band according to the configuration information, wherein the first channel state information includes precoding matrix information.

At S206, the second communication node feeds back the first channel state information to the first communication node.

It should be pointed out that FIG. 1 illustrates a wireless communication scenario to which the scheme recited in the present embodiment is applicable. The first communication node includes one of the following: UE or a network side device. The second communication node includes one of the following: the UE or the network side device. Other nodes that can implement wireless communication are also applicable to the present embodiment.

As an exemplary implementation, the second communication node determines a second target frequency band and generates second channel state information corresponding to the second target frequency band according to the configuration information, wherein the channel state information consists of the first channel state information and the second channel state information; and the second communication node feeds back the second channel state information to the first communication node.

As an exemplary implementation, the first target frequency band is a frequency band to which the precoding matrix information is applicable, that is, the precoding matrix information is fed back for the first target frequency band(s). The second target frequency band is a frequency band to which other channel state information except the precoding matrix information is applicable, that is, other channel state information is fed back for the second target frequency band(s). Herein, the other channel state information includes, for example, channel quality indication information and channel intensity information. The second communication node can accurately determine the precoding matrix information on the target frequency band under the premise of determining the first target frequency band, so as to accurately feed back the precoding matrix information on the target frequency band. The second communication node can accurately determine other channel state information except the precoding matrix information under the premise of determining the second target frequency band, so as to accurately feed back other channel state information on the corresponding target frequency band. The first communication node can accurately determine the frequency band to which the received precoding matrix information is applicable under the premise of obtaining the first target frequency band, so as to determine an appropriate scheme of using precoding. The first communication node can accurately determine the frequency band to which other channel state information received is applicable under the premise of obtaining the second target frequency band, so as to determine an appropriate scheme of using other channel state information.

As an exemplary implementation, the configuration information further includes preset position information. The second communication node determines a position of the first target frequency band and/or a position of the second target frequency band according to the preset position information.

As an exemplary implementation, the preset position information includes at least one of the following: preset start position information and preset end position information. The operation that the second communication node determines the position of the first target frequency band and/or the position of the second target frequency band according to the preset position information includes that: the second communication node determines a start position of the first target frequency band or a start position of the second target frequency band according to the preset start position information; and/or, the second communication node determines an end position of the first target frequency band or an end position of the second target frequency band according to the preset end position information.

For example, the first target frequency band is equal to the second target frequency band. For another example, the first target frequency band includes a frequency band located lower than the second target frequency band. For another example, the first target frequency band includes a frequency band located higher than the second target frequency band.

Figure 3:
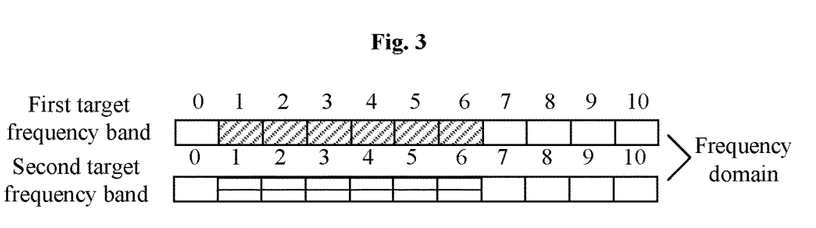
FIG. 3 is a schematic diagram in a frequency domain according to an embodiment of the present disclosure.
Figure 4:
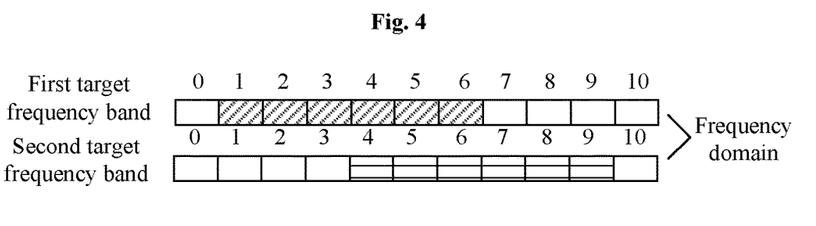
FIG. 4 is another schematic diagram in a frequency domain according to an embodiment of the present disclosure.
Figure 5:
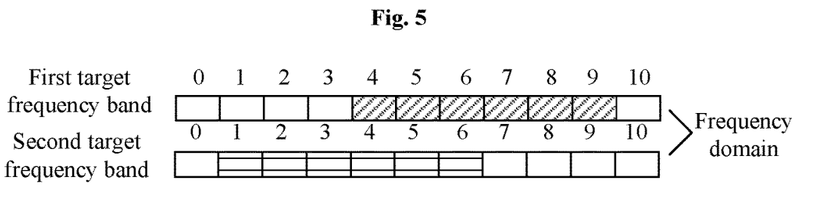
FIG. 5 is another schematic diagram in a frequency domain according to an embodiment of the present disclosure.

FIG. 3 is a schematic diagram in a frequency domain according to an embodiment of the present disclosure. FIG. 4 is another schematic diagram in a frequency domain according to an embodiment of the present disclosure. FIG. 5 is another schematic diagram in a frequency domain according to an embodiment of the present disclosure. For ease of understanding, in FIG. 3 to FIG. 5, the first target frequency band and the second target frequency band are illustrated by comparison in the same frequency domain range through two schematic diagrams in the frequency domain. As shown in FIG. 3, a frequency domain unit of the diagonal line part corresponding to the first target frequency band is {1, 2, 3, 4, 5, 6}, and the frequency domain unit of the horizontal line part corresponding to the second target frequency band is {1, 2, 3, 4, 5, 6}. Therefore, the first target frequency band is equal to the second target frequency band. As shown in FIG. 4, the frequency domain unit of the diagonal line part corresponding to the first target frequency band is {1, 2, 3, 4, 5, 6}, and the frequency domain unit of the horizontal line part corresponding to the second target frequency band is {4, 5, 6, 7, 8, 9}. Therefore, the first target frequency band includes the frequency band located lower than the second target frequency band. As shown in FIG. 5, the frequency domain unit of the diagonal line part corresponding to the first target frequency band is {4, 5, 6, 7, 8, 9}, and the frequency domain unit of the horizontal line part corresponding to the second target frequency band is {1, 2, 3, 4, 5, 6}. Therefore, the first target frequency band includes the frequency band located higher than the second target frequency band. It should be pointed out that the first target frequency band may include, for example, both the frequency band located lower than the second target frequency band and the frequency band located higher than the second target frequency band, which will not be described in details here.

According to another embodiment, the first frequency band is determined according to the second target frequency band. For example, the first target frequency band is equal to the second target frequency band.

By determining the first target frequency band according to the second target frequency band, the resource cost for indicating the first target frequency band can be saved. The channel state information includes precoding matrix information. There is a certain correlation between the first target frequency band (the target frequency band of the precoding matrix information) and the second target frequency band (the target frequency band of the channel state information except the precoding matrix information), and the resource cost for indicating the first target frequency band can be saved by using the correlation between the first target frequency band and the second target frequency band.

For another example, the first target frequency band consists of the second target frequency band and a frequency band whose start position is lower than a start position of the second target frequency band. For another example, the first target frequency band consists of the second target frequency band and a frequency band whose end position is higher than an end position of the second target frequency band. For another example, the first target frequency band consists of the second target frequency band, a frequency band whose start position is lower than a start position of the second target frequency band, and a frequency band whose end position is higher than an end position of the second target frequency band.

Figure 6:
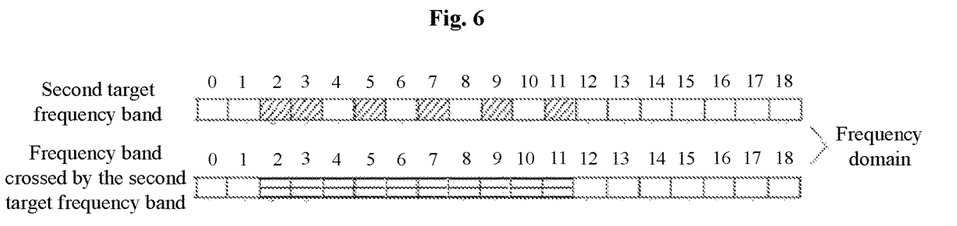
FIG. 6 is another schematic diagram in a frequency domain according to an embodiment of the present disclosure.

An illustration is given in combination with FIG. 6. As shown in FIG. 6, a continuous frequency domain is divided into 19 frequency domain units, marked as {0, 1, 2 . . . , 18}, and the set of frequency domain units marked by diagonal lines in the figure is the second target frequency band, that is, the frequency domain units {2, 3, 5, 7, 9, 11}. The first target frequency band is equal to the second target frequency band, for example, the frequency domain units of the first target frequency band are {2, 3, 5, 7, 9, 11}. The first target frequency band consists of the second target frequency band and a frequency band whose start position is lower than a start position of the second target frequency band, for example, the frequency domain units of the first target frequency band are {1, 2, 3, 5, 7, 9, 11}. The first target frequency band consists of the second target frequency band and a frequency band whose end position is higher than an end position of the second target frequency band, for example, the frequency domain units of the first target frequency band are {2, 3, 5, 7, 9, 11, 12}. The first target frequency band consists of the second target frequency band, a frequency band whose start position is lower than a start position of the second target frequency band, and a frequency band whose end position is higher than an end position of the second target frequency band, for example, the frequency domain units of the first target frequency band are {1, 2, 3, 5, 7, 9, 11, 12}.

According to another embodiment, the first target frequency band is determined according to a frequency band crossed by the second target frequency band.

It is to be noted that the frequency band crossed by the second target frequency band is a continuous frequency band, whose start position is the start position of the second target frequency band, and end position is the end position of the second target frequency band.

The first target frequency band is determined according to a frequency band crossed by the second target frequency band, so that the precoding matrix information of a larger range of frequency bands including the second target frequency band can be provided, and the first target frequency band is closely related to the second target frequency band. That is, the first communication node can obtain more precoding matrix information about the second target frequency band, which is helpful to determine a transmission scheme.

For example, the first target frequency band is equal to the frequency band crossed by the second target frequency band.

For another example, the first target frequency band consists of a frequency band crossed by the second target frequency band and a frequency band whose start position is lower than a start position of the second target frequency band. For another example, the first target frequency band consists of a frequency band crossed by the second target frequency band and a frequency band whose end position is higher than an end position of the second target frequency band. For another example, the first target frequency band consists of a frequency band crossed by the second target frequency band, a frequency band whose start position is lower than a start position of the second target frequency band, and a frequency band whose end position is higher than an end position of the second target frequency band.

An illustration is given in combination with FIG. 6. As shown in FIG. 6, a continuous frequency domain is divided into 19 frequency domain units, marked as {0, 1, 2 . . . , 18}, and the set of frequency domain units marked by diagonal lines in the figure is the second target frequency band, that is, the frequency domain units {2, 3, 5, 7, 9, 11}. The frequency band crossed by the second target frequency band is the frequency domain units {2, 3, 4, 5, 6, 7, 8, 9, 10, 11}. The first target frequency band is equal to the frequency band crossed by the second target frequency band, for example, the frequency domain units of the first target frequency band are {2, 3, 4, 5, 6, 7, 8, 9, 10, 11}. The first target frequency band consists of a frequency band crossed by the second target frequency band and a frequency band whose start position is lower than a start position of the second target frequency band, for example, the frequency domain units of the first target frequency band are {1, 2, 3, 4, 5, 6, 7, 8, 9, 10, 11}. The first target frequency band consists of a frequency band crossed by the second target frequency band and a frequency band whose end position is higher than an end position of the second target frequency band, for example, the frequency domain units of the first target frequency band are {2, 3, 4, 5, 6, 7, 8, 9, 10, 11, 12}. The first target frequency band consists of a frequency band crossed by the second target frequency band, a frequency band whose start position is lower than a start position of the second target frequency band, and a frequency band whose end position is higher than an end position of the second target frequency band, for example, the frequency domain units of the first target frequency band are {1, 2, 3, 4, 5, 6, 7, 8, 9, 10, 11, 12}.

In another embodiment, the second communication node determines the first target frequency band according to the configuration information. For example, the discontinuity of the second target frequency band in the frequency domain indicates that the first target frequency band includes the frequency band crossed by the second target frequency band. For another example, the first target frequency band includes a frequency band crossed by the second target frequency band which is discontinuous in a frequency domain.

As an exemplary implementation, when it is analyzed according to the configuration information that the second target frequency band is discontinuous in the frequency domain, the second communication node determines that the first target frequency band includes the frequency band crossed by the second target frequency band. Alternatively, the second communication node determines that the first target frequency band includes a frequency band crossed by the second target frequency band which is discontinuous in a frequency domain.

Therefore, because the frequency band crossed by the second target frequency band that the first target frequency band includes is continuous, a channel coefficient is smoother in the continuous frequency domain, and the processing from the channel coefficient to the precoding matrix information is easier, which reduces the complexity.

As an exemplary implementation, the operation that the second communication node determines the first target frequency band according to the configuration information includes that: the second communication node determines the first target frequency band according to the second target frequency band and a bandwidth block. The bandwidth block is a continuous frequency band in working carriers, and includes the second target frequency band.

In this way, the relationship between the complexity of obtaining the precoding matrix information to be fed back and the feedback overhead can be balanced.

As an exemplary implementation, the operation that the second communication node determines the first target frequency band according to the second target frequency band and the bandwidth block includes that: the second communication node determines the first target frequency band according to a first bandwidth ratio of the second target frequency band to the bandwidth block.

As an exemplary implementation, the operation that the second communication node determines the first target frequency band according to the first bandwidth ratio of the second target frequency band to the bandwidth block includes that: in a case where the first bandwidth ratio is greater than or equal to a first preset ratio threshold, the second communication node determines the first target frequency band according to a frequency band crossed by the second target frequency band. In this way, the complexity of obtaining the precoding matrix information to be fed back is reduced without increasing the cost of feedback resources. In a case where the first bandwidth ratio is less than the first preset ratio threshold, the second communication node determines the first target frequency band according to the second target frequency band. In this way, the cost of feedback resources can be reduced. Alternatively, the second communication node determines the first target frequency band according to the number of number of resources fed back.

As an exemplary implementation, the operation that the second communication node determines the first target frequency band according to the bandwidth ratio of the second target frequency band to the bandwidth block further includes that: the second communication node determines the first target frequency band according to a first ratio of the bandwidth of the second target frequency band to a first threshold value and a second ratio of the bandwidth of the bandwidth block to a second threshold value.

For example, Table 1 shows a method for determination according to the first ratio and the second ratio, as shown in Table 1:

TABLE 1

| | |
|---|---|
| The first ratio >1, and the second ratio >1 | The first target frequency band is determined according to the frequency band crossed by the second target frequency band |
| The first ratio >1, and the second ratio <1 | The first target frequency band is equal to the bandwidth of the bandwidth block |
| The first ratio <1, and the second ratio <1 | The first target frequency band is determined according to the frequency band crossed by the second target frequency band |
| The first ratio <1, and the second ratio >1 | The first target frequency band is determined according to the second target frequency band |

For example, Table 2 shows another method for determination according to the first ratio and the second ratio, as shown in Table 2:

TABLE 2

| | |
|---|---|
| The first ratio >1, and the second ratio >1 | The second target frequency band is determined according to the frequency band crossed by the second target frequency band |
| The first ratio >1, and the second ratio <1 | The first target frequency band is equal to the bandwidth of the bandwidth block |
| The first ratio <1, and the second ratio <1 | The first target frequency band is equal to the bandwidth of the bandwidth block |
| The first ratio <1, and the second ratio >1 | The first target frequency band is determined according to the second target frequency band |

As an exemplary implementation, the operation that the second communication node determines the first target frequency band according to the configuration information includes that: the second communication node determines the first target frequency band according to a bandwidth of the second target frequency band and a bandwidth of a frequency band crossed by the second target frequency band.

In this way, the relationship between the complexity of obtaining the precoding matrix information to be fed back and the feedback overhead can be balanced.

As an exemplary implementation, the operation that the second communication node determines the first target frequency band according to the bandwidth of the second target frequency band and the bandwidth of the frequency band crossed by the second target frequency band includes that: the second communication node determines the first target frequency band according to a second bandwidth ratio of the bandwidth of the second target frequency band to the bandwidth of the frequency band crossed by the second target frequency band.

As an exemplary implementation, the operation that the second communication node determines the first target frequency band according to the second bandwidth ratio of the bandwidth of the second target frequency band to the bandwidth of the frequency band crossed by the second target frequency band includes one of the following: 1) in a case where the second bandwidth ratio is greater than or equal to a second preset ratio threshold, the second communication node determines the first target frequency band according to the frequency band crossed by the second target frequency band; in this way, the complexity of obtaining the precoding matrix information to be fed back is reduced without increasing the cost of feedback resources; 2) in a case where the second bandwidth ratio is less than the second preset ratio threshold, the second communication node determines the first target frequency band according to the second target frequency band; in this way, the cost of feedback resources can be reduced; alternatively, the second communication node determines the first target frequency band according to the number of number of resources fed back.

As an exemplary implementation, the operation that the second communication node determines the first target frequency band according to the second target frequency band and the frequency band crossed by the second target frequency band includes that: the second communication node determines the first target frequency band according to a first size and a second size. The first size is a size of a codebook vector determined according to the second target frequency band, and the second size is a size of a codebook vector determined according to the frequency band crossed by the second target frequency band.

As an exemplary implementation, the operation that the second communication node determines the first target frequency band according to the first size and the second size includes that: in a case where the first size is greater than or equal to the second size, the second communication node determines that the first target frequency band is equal to the frequency band crossed by the second target frequency band; and in a case where the first size is less than the second size, the second communication node determines that the first target frequency band is equal to the second target frequency band.

As an exemplary implementation, the operation that the second communication node generates the first channel state information corresponding to the first target frequency band includes that: the second communication node determines the first target frequency band according to indication information. The indication information includes at least one of the following: first indication information used for indicating the first target frequency band by way of bit mapping, wherein the size of the frequency domain unit corresponding to each bit is indicated by a network side node; second indication information used for indicating a start position and a bandwidth of the first target frequency band; third indication information used for indicating a start position and an end position of the first target frequency band; and fourth indication information used for indicating an end position and a bandwidth of the first target frequency band. Corresponding to the second indication information, the first target frequency band is a continuous frequency band starting from the start position, whose frequency bandwidth is the frequency bandwidth. Corresponding to the third indication information, the first target frequency band is a continuous frequency band starting from the start position and ending at the end position. Corresponding to the fourth indication information, the first target frequency band is a continuous frequency band ending at the end position, whose frequency bandwidth is the frequency bandwidth.

As an exemplary implementation, the configuration information further includes determination indication information. Before the second communication node determines the first target frequency band according to the configuration information, the method further includes that: the second communication node obtains a way of determining the first target frequency band according to the determination indication information. The determination indication information includes one of the following: the first target frequency band is determined according to the second target frequency band; or the first target frequency band is determined according to a frequency band crossed by the second target frequency band. In this way, the complexity and the overhead can be balanced by the first communication node to achieve the comprehensive effect of a system.

As an exemplary implementation, the configuration information further includes frequency band information of the second target frequency band. The frequency band information of the second target frequency band includes at least one of the following: a start position and a bandwidth of the second target frequency band; an end position and a bandwidth of the second target frequency band; a start position and an end position of the second target frequency band; and continuity of the second target frequency band in a frequency domain.

As an exemplary implementation, the frequency band information of the second target frequency band further includes: fifth indication information used for indicating the second target frequency band by way of bit mapping. It is determined according to the fifth indication information that the first target frequency band is equal to the frequency band crossed by the second target frequency band.

As an exemplary implementation, the operation that the second communication node determines the first target frequency band includes that: the second communication node determines that the first target frequency band is equal to the second target frequency band according to the frequency band information of the second target frequency band. For example, it is determined according to the frequency band information of the second target frequency band that the first target frequency band is equal to the second target frequency band. The frequency band information includes one of the following: a start position and a bandwidth of the second target frequency band; an end position and a bandwidth of the second target frequency band; a start position and an end position of the second target frequency band; or continuity of the second target frequency band in a frequency domain.

In another embodiment, the operation that the second communication node determines the first target frequency band and the second target frequency band includes that: the first target frequency band is determined according to the way in which the second target frequency band is indicated.

For example, if the second target frequency band is indicated by way of bit mapping, it is determined that the first target frequency band is equal to the frequency band crossed by the second target frequency band. For another example, it is determined that the first target frequency band is equal to the second target frequency band if the second target frequency band is indicated by one of the following ways:

the start position and the length of the target frequency band of the channel state information are indicated;

the start position and the end position of the target frequency band of the channel state information are indicated; and the target frequency band of the channel state information is indicated to be continuous in the frequency domain.

In another embodiment, the operation that the second communication node determines the first target frequency band and the second target frequency band includes that: the first target frequency band being equal to the second target frequency band is associated with the way in which the second target frequency band is indicated.

For example, the way in which the second target frequency band is indicated is determined based on that the first target frequency band is equal to the second target frequency band. For example, the first target frequency band being equal to the second target frequency band is determined by the way in which the second target frequency band is indicated. For example, that the first target frequency band is equal to the second target frequency band and the way in which the second target frequency band is indicated exist simultaneously. In this way, the second target frequency band and the first target frequency band can be indicated at the same time by using the overhead of a target frequency band indicating the channel state information, so as to achieve the effect of saving the cost of resources.

For another example, the operation that the first target frequency band being equal to the second target frequency band is associated with the way in which the second target frequency band is indicated includes: the way in which the second target frequency band is indicated includes one of the following:

the second target frequency band is determined by the configured start position and length;

the second target frequency band is determined by the configured start position and end position; or the second target frequency band is configured to be continuous in the frequency domain.

In this way, the complexity of obtaining the precoding matrix information to be fed back can be reduced.

In another embodiment, the way in which the second target frequency band is indicated is determined according to a codebook type. For example, the way in which the second target frequency band is indicated is determined according to the codebook type in one of the following manners:

the second target frequency band is determined by the configured start position and length;

the second target frequency band is determined by the configured start position and end position; or the second target frequency band is configured to be continuous in the frequency domain.

Through the description of the above embodiments, those having ordinary skill in the art may clearly know that the method in the embodiments may be implemented by means of software plus a necessary common hardware platform, or by means of hardware. Based on this understanding, the present disclosure can be embodied in the form of software product; the computer software product is stored in a storage medium (for example, an ROM/an RAM, a magnetic disk, and a compact disc) and includes a number of instructions to make a terminal device (which can be a cell phone, a personal computer, a server or a network device, etc.) perform all or part of the method in each embodiment of the present disclosure.

Embodiment 2

Figure 7:
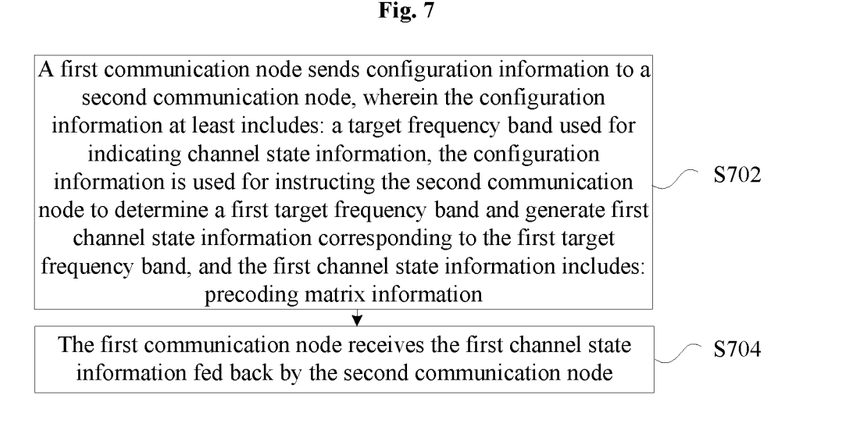
FIG. 7 is a flowchart of a channel state information receiving method according to an embodiment of the present disclosure.

A channel state information receiving method is provided in the present embodiment. FIG. 7 is a flowchart of a channel state information receiving method according to an embodiment of the present disclosure. As shown in FIG. 7, the flow may include the following operations.

At S702, a first communication node sends configuration information to a second communication node, wherein the configuration information at least includes: a target frequency band used for indicating channel state information, and the configuration information is used for instructing the second communication node to determine a first target frequency band and generate first channel state information corresponding to the first target frequency band. The first channel state information includes precoding matrix information.

At S704, the first communication node receives the first channel state information fed back by the second communication node.

As an exemplary implementation, the configuration information is further used for instructing the second communication node to determine a second target frequency band and generate second channel state information corresponding to the second target frequency band. The channel state information consists of the first channel state information and the second channel state information. The first communication node receives the second channel state information fed back by the second communication node.

It should be pointed out that FIG. 1 illustrates a wireless communication scenario to which the scheme recited in the present embodiment is applicable. The first communication node includes one of the following: UE or a network side device. The second communication node includes one of the following: the UE or the network side device. Other nodes that can implement wireless communication are also applicable to the present embodiment.

As an exemplary implementation, the first target frequency band is a frequency band to which the precoding matrix information is applicable, that is, the precoding matrix information is fed back for the first target frequency band(s). The second target frequency band is a frequency band to which other channel state information except the precoding matrix information is applicable, that is, other channel state information is fed back for the second target frequency band(s). Herein, the other channel state information includes, for example, channel quality indication information and channel intensity information. The second communication node can accurately determine the precoding matrix information on the target frequency band under the premise of determining the first target frequency band, so as to accurately feed back the precoding matrix information on the target frequency band. The second communication node can accurately determine other channel state information except the precoding matrix information under the premise of determining the second target frequency band, so as to accurately feed back other channel state information on the corresponding target frequency band. The first communication node can accurately determine the frequency band to which the received precoding matrix information is applicable under the premise of obtaining the first target frequency band, so as to determine an appropriate scheme of using precoding. The first communication node can accurately determine the frequency band to which other channel state information received is applicable under the premise of obtaining the second target frequency band, so as to determine an appropriate scheme of using other channel state information.

As an exemplary implementation, the configuration information further includes preset position information. The second communication node determines a position of the first target frequency band and/or a position of the second target frequency band according to the preset position information.

As an exemplary implementation, the preset position information includes at least one of the following: preset start position information and preset end position information. The operation that the second communication node determines the position of the first target frequency band and/or the position of the second target frequency band according to the preset position information includes that: the second communication node determines a start position of the first target frequency band or a start position of the second target frequency band according to the preset start position information; and/or, the second communication node determines an end position of the first target frequency band or an end position of the second target frequency band according to the preset end position information.

For example, the first target frequency band is equal to the second target frequency band. For another example, the first target frequency band includes a frequency band located lower than the second target frequency band. For another example, the first target frequency band includes a frequency band located higher than the second target frequency band.

According to another embodiment, the first target frequency band is determined according to the second target frequency band. For example, the first target frequency band is equal to the second target frequency band.

By determining the first target frequency band according to the second target frequency band, the resource cost for indicating the first target frequency band can be saved. The channel state information includes precoding matrix information. There is a certain correlation between the first target frequency band (the target frequency band of the precoding matrix information) and the second target frequency band (the target frequency band of the channel state information except the precoding matrix information), and the resource cost for indicating the first target frequency band can be saved by using the correlation between the first target frequency band and the second target frequency band.

For another example, the first target frequency band consists of the second target frequency band and a frequency band whose start position is lower than a start position of the second target frequency band. For another example, the first target frequency band consists of the second target frequency band and a frequency band whose end position is higher than an end position of the second target frequency band. For another example, the first target frequency band consists of the second target frequency band, a frequency band whose start position is lower than a start position of the second target frequency band, and a frequency band whose end position is higher than an end position of the second target frequency band.

According to another embodiment, the first target frequency band is determined according to a frequency band crossed by the second target frequency band.

It is to be noted that the frequency band crossed by the second target frequency band is a continuous frequency band, whose start position is the start position of the second target frequency band, and end position is the end position of the second target frequency band.

The first target frequency band is determined according to a frequency band crossed by the second target frequency band, so that the precoding matrix information of a larger range of frequency bands including the second target frequency band can be provided, and the first target frequency band is closely related to the second target frequency band. That is, the first communication node can obtain more precoding matrix information about the second target frequency band, which is helpful to determine a transmission scheme.

For example, the first target frequency band is equal to the frequency band crossed by the second target frequency band. For another example, the first target frequency band consists of a frequency band crossed by the second target frequency band and a frequency band whose start position is lower than a start position of the second target frequency band. For another example, the first target frequency band consists of a frequency band crossed by the second target frequency band and a frequency band whose end position is higher than an end position of the second target frequency band. For another example, the first target frequency band consists of a frequency band crossed by the second target frequency band, a frequency band whose start position is lower than a start position of the second target frequency band, and a frequency band whose end position is higher than an end position of the second target frequency band.

In another embodiment, the second communication node determines the first target frequency band according to the configuration information. For example, the discontinuity of the second target frequency band in the frequency domain indicates that the first target frequency band includes the frequency band crossed by the second target frequency band. For another example, the first target frequency band includes a frequency band crossed by the second target frequency band which is discontinuous in a frequency domain.

As an exemplary implementation, when it is analyzed according to the configuration information that the second target frequency band is discontinuous in the frequency domain, the second communication node determines that the first target frequency band includes the frequency band crossed by the second target frequency band. Alternatively, the second communication node determines that the first target frequency band includes a frequency band crossed by the second target frequency band which is discontinuous in a frequency domain.

Therefore, because the frequency band crossed by the second target frequency band that the first target frequency band includes is continuous, a channel coefficient is smoother in the continuous frequency domain, and the processing from the channel coefficient to the precoding matrix information is easier, which reduces the complexity.

As an exemplary implementation, the operation that the second communication node determines the first target frequency band according to the configuration information includes that: the second communication node determines the first target frequency band according to the second target frequency band and a bandwidth block. The bandwidth block is a continuous frequency band in working carriers, and includes the second target frequency band.

In this way, the relationship between the complexity of obtaining the precoding matrix information to be fed back and the feedback overhead can be balanced.

As an exemplary implementation, the operation that the second communication node determines the first target frequency band according to the second target frequency band and the bandwidth block includes that: the second communication node determines the first target frequency band according to a first bandwidth ratio of the second target frequency band to the bandwidth block.

As an exemplary implementation, the operation that the second communication node determines the first target frequency band according to the first bandwidth ratio of the second target frequency band to the bandwidth block includes that: in a case where the first bandwidth ratio is greater than or equal to a first preset ratio threshold, the second communication node determines the first target frequency band according to a frequency band crossed by the second target frequency band. In this way, the complexity of obtaining the precoding matrix information to be fed back is reduced without increasing the cost of feedback resources. In a case where the first bandwidth ratio is less than the first preset ratio threshold, the second communication node determines the first target frequency band according to the second target frequency band. Alternatively, the second communication node determines the first target frequency band according to the number of number of resources fed back.

As an exemplary implementation, the operation that the second communication node determines the first target frequency band according to the bandwidth ratio of the second target frequency band to the bandwidth block further includes that: the second communication node determines the first target frequency band according to a first ratio of the bandwidth of the second target frequency band to a first threshold value and a second ratio of the bandwidth of the bandwidth block to a second threshold value.

As an exemplary implementation, the first ratio and the second ratio may be determined according to the way given in Table 1 and Table 2 in embodiment 1, which will not be repeated here.

As an exemplary implementation, the operation that the second communication node determines the first target frequency band according to the configuration information includes that: the second communication node determines the first target frequency band according to a bandwidth of the second target frequency band and a bandwidth of a frequency band crossed by the second target frequency band.

In this way, the relationship between the complexity of obtaining the precoding matrix information to be fed back and the feedback overhead can be balanced.

As an exemplary implementation, the operation that the second communication node determines the first target frequency band according to the bandwidth of the second target frequency band and the bandwidth of the frequency band crossed by the second target frequency band includes that: the second communication node determines the first target frequency band according to a second bandwidth ratio of the bandwidth of the second target frequency band to the bandwidth of the frequency band crossed by the second target frequency band.

As an exemplary implementation, the operation that the second communication node determines the first target frequency band according to the second bandwidth ratio of the bandwidth of the second target frequency band to the bandwidth of the frequency band crossed by the second target frequency band includes one of the following:

in a case where the second bandwidth ratio is greater than or equal to the second preset ratio threshold, the second communication node determines the first target frequency band according to the frequency band crossed by the second target frequency band; in this way, the complexity of obtaining the precoding matrix information to be fed back is reduced without increasing the cost of feedback resources;

in a case where the second bandwidth ratio is less than the second preset ratio threshold, the second communication node determines the first target frequency band according to the second target frequency band; in this way, the cost of feedback resources can be reduced; or, the second communication node determines the first target frequency band according to the number of number of resources fed back.

As an exemplary implementation, the operation that the second communication node determines the first target frequency band according to the second target frequency band and the frequency band crossed by the second target frequency band includes that: the second communication node determines the first target frequency band according to a first size and a second size. The first size is a size of a codebook vector determined according to the second target frequency band, and the second size is a size of a codebook vector determined according to the frequency band crossed by the second target frequency band.

As an exemplary implementation, the operation that the second communication node determines the first target frequency band according to the first size and the second size includes that: in a case where the first size is greater than or equal to the second size, the second communication node determines that the first target frequency band is equal to the frequency band crossed by the second target frequency band; and in a case where the first size is less than the second size, the second communication node determines that the first target frequency band is equal to the second target frequency band.

As an exemplary implementation, the operation that the second communication node generates the first channel state information corresponding to the first target frequency band includes that: the second communication node determines the first target frequency band according to indication information. The indication information includes at least one of the following: first indication information used for indicating the first target frequency band by way of bit mapping, wherein the size of the frequency domain unit corresponding to each bit is indicated by a network side node; second indication information used for indicating a start position and a bandwidth of the first target frequency band; third indication information used for indicating a start position and an end position of the first target frequency band; and fourth indication information used for indicating an end position and a bandwidth of the first target frequency band. Corresponding to the second indication information, the first target frequency band is a continuous frequency band starting from the start position, whose frequency bandwidth is the frequency bandwidth. Corresponding to the third indication information, the first target frequency band is a continuous frequency band starting from the start position and ending at the end position. Corresponding to the fourth indication information, the first target frequency band is a continuous frequency band ending at the end position, whose frequency bandwidth is the frequency bandwidth.

As an exemplary implementation, the configuration information further includes determination indication information. Before the second communication node determines the first target frequency band according to the configuration information, the method further includes that: the second communication node obtains a way of determining the first target frequency band according to the determination indication information. The determination indication information includes one of the following: the first target frequency band is determined according to the second target frequency band; and the first target frequency band is determined according to a frequency band crossed by the second target frequency band. In this way, the complexity and the overhead can be balanced by the first communication node to achieve the comprehensive effect of a system.

As an exemplary implementation, the configuration information further includes frequency band information of the second target frequency band. The frequency band information of the second target frequency band includes at least one of the following: a start position and a bandwidth of the second target frequency band; an end position and a bandwidth of the second target frequency band; a start position and an end position of the second target frequency band; and continuity of the second target frequency band in a frequency domain.

As an exemplary implementation, the frequency band information of the second target frequency band further includes: fifth indication information used for indicating the second target frequency band by way of bit mapping. It is determined according to the fifth indication information that the first target frequency band is equal to the frequency band crossed by the second target frequency band.

As an exemplary implementation, the operation that the second communication node determines the first target frequency band includes that: the second communication node determines that the first target frequency band is equal to the second target frequency band according to the frequency band information of the second target frequency band. For example, it is determined according to the frequency band information of the second target frequency band that the first target frequency band is equal to the second target frequency band. The frequency band information includes one of the following: a start position and a bandwidth of the second target frequency band; an end position and a bandwidth of the second target frequency band; a start position and an end position of the second target frequency band; or continuity of the second target frequency band in a frequency domain.

In another embodiment, the operation that the second communication node determines the first target frequency band and the second target frequency band includes that: the first target frequency band is determined according to the way in which the second target frequency band is indicated.

For example, if the second target frequency band is indicated by way of bit mapping, it is determined that the first target frequency band is equal to the frequency band crossed by the second target frequency band. For another example, it is determined that the first target frequency band is equal to the second target frequency band if the second target frequency band is indicated by one of the following ways:

the start position and the length of the target frequency band of the channel state information are indicated;

the start position and the end position of the target frequency band of the channel state information are indicated; or the target frequency band of the channel state information is indicated to be continuous in the frequency domain.

In another embodiment, the operation that the second communication node determines the first target frequency band and the second target frequency band includes that: the first target frequency band being equal to the second target frequency band is associated with the way in which the second target frequency band is indicated.

For example, the way in which the second target frequency band is indicated is determined based on that the first target frequency band is equal to the second target frequency band. For example, the first target frequency band being equal to the second target frequency band is determined by the way in which the second target frequency band is indicated. For example, that the first target frequency band is equal to the second target frequency band and the way in which the second target frequency band is indicated exist simultaneously. In this way, the second target frequency band and the first target frequency band can be indicated at the same time by using the overhead of a target frequency band indicating the channel state information, so as to achieve the effect of saving the cost of resources.

For another example, the operation that the first target frequency band being equal to the second target frequency band is associated with the way in which the second target frequency band is indicated includes: the way in which the second target frequency band is indicated includes one of the following:

the second target frequency band is determined by the configured start position and length;

the second target frequency band is determined by the configured start position and end position; or the second target frequency band is configured to be continuous in the frequency domain.

In this way, the complexity of obtaining the precoding matrix information to be fed back can be reduced.

In another embodiment, the way in which the second target frequency band is indicated is determined according to a codebook type. For example, the way in which the second target frequency band is indicated is determined according to the codebook type in one of the following manners:

the second target frequency band is determined by the configured start position and length;

the second target frequency band is determined by the configured start position and end position; or the second target frequency band is configured to be continuous in the frequency domain.

Third Embodiment

The present embodiment provides a channel state information processing apparatus, which is configured to implement the above embodiments and exemplary implementations. The embodiments which have been elaborated will not be repeated here. The term "module" used below can realize a combination of software and/or hardware with an intended function. Although the apparatus described in the following embodiment may be realized through software better, the realization through hardware or a combination of software and hardware is possible and conceived.

Figure 8:
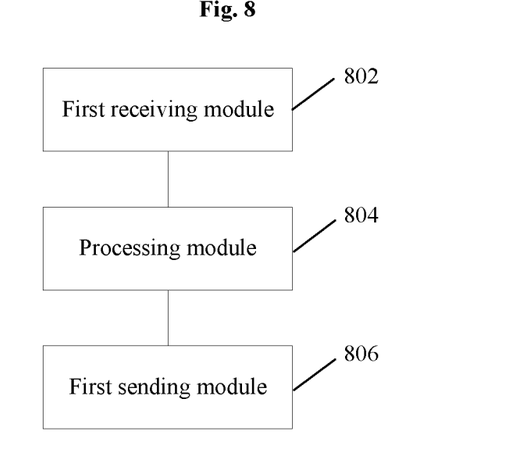
FIG. 8 is a structural block diagram of a channel state information processing apparatus according to an embodiment of the present disclosure.

FIG. 8 is a structure diagram of a channel state information processing apparatus according to an embodiment of the present disclosure. As shown in FIG. 8, the apparatus may include: a first receiving module 802, a processing module 804, and a first sending module 806.

The first receiving module 802 is configured to receive configuration information sent by a first communication node. The configuration information includes: the target frequency band used for indicating the channel state information.

The processing module 804 is configured to determine a first target frequency band and generate first channel state information corresponding to the first target frequency band according to the configuration information. The first channel state information includes precoding matrix information.

The first sending module 806 is configured to feed back the first channel state information to the first communication node.

Fourth Embodiment

The present embodiment provides a channel state information receiving apparatus, which is configured to implement the above embodiments and exemplary implementations. The embodiments which have been elaborated will not be repeated here. The term "module" used below can realize a combination of software and/or hardware with an intended function. Although the apparatus described in the following embodiment may be realized through software better, the realization through hardware or a combination of software and hardware is possible and conceived.

Figure 9:
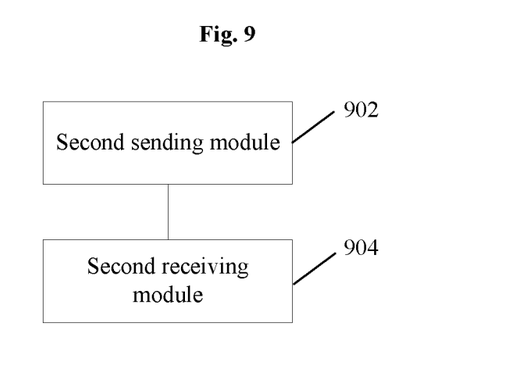
FIG. 9 is a structural block diagram of a channel state information receiving apparatus according to an embodiment of the present disclosure.

FIG. 9 is a structure diagram of a channel state information receiving apparatus according to an embodiment of the present disclosure. As shown in FIG. 9, the apparatus may include: a second sending module 902 and a second receiving module 904.

The second sending module 902 is configured to send configuration information to a second communication node. The configuration information includes: the target frequency band used for indicating the channel state information. The configuration information is used for instructing the second communication node to determine a first target frequency band and generate first channel state information corresponding to the first target frequency band. The first channel state information includes precoding matrix information.

The second receiving module 904 is configured to receive the first channel state information fed back by the second communication node.

It is to be noted that, each of the above modules may be realized by software or hardware. For the latter, the each of the above modules may be realized by, but not limited to, the following way: all of the above modules are in the same processor; or, the above modules are respectively in different processors in form of any combination.

Fifth Embodiment

The embodiment of the disclosure provides a storage medium. The storage medium stores a computer program. The computer program is configured to perform, at runtime, operations in any of the above method embodiments.

As an exemplary implementation of the present embodiment, the storage medium may be configured to store a computer program for executing the following operations.

At S1, the second communication node receives the configuration information sent by the first communication node, wherein the configuration information at least includes: a target frequency band used for indicating channel state information.

At S2, the second communication node determines the first target frequency band and generates the first channel state information corresponding to the first target frequency band according to the configuration information, wherein the first channel state information includes precoding matrix information.

At S3, the second communication node feeds back the first channel state information to the first communication node.

Or,

At S1, the first communication node sends the configuration information to the second communication node, wherein the configuration information at least includes: a target frequency band used for indicating channel state information, and the configuration information is used for instructing the second communication node to determine a first target frequency band and generate first channel state information corresponding to the first target frequency band. The first channel state information includes precoding matrix information.

At S2, the first communication node receives the first channel state information fed back by the second communication node.

As an exemplary implementation of the present embodiment, the storage media include, but not limited to, a USB flash disk, a Read-Only Memory (ROM), a Random Access Memory (RAM), a mobile hard disk, a magnetic disk, a compact disc, and other media capable of storing the computer program.

The embodiments of the present disclosure also provide an electronic device, which includes a memory and a processor. The memory stores a computer program. The processor is configured to run the computer program to execute the operations in any above method embodiment.

As an exemplary implementation, the electronic device may also include a transmission device and an input/output device. The transmission device is connected with the processor, and the input/output device is connected with the processor.

As an exemplary implementation, of the present embodiment, the processor may be configured to execute the following operations through the computer program.

At S1, the second communication node receives the configuration information sent by the first communication node, wherein the configuration information at least includes: a target frequency band used for indicating channel state information.

At S2, the second communication node determines the first target frequency band and generates the first channel state information corresponding to the first target frequency band according to the configuration information, wherein the first channel state information includes precoding matrix information.

At S3, the second communication node feeds back the first channel state information to the first communication node.

Or,

At S1, the first communication node sends the configuration information to the second communication node, wherein the configuration information at least includes: a target frequency band used for indicating channel state information, and the configuration information is used for instructing the second communication node to determine a first target frequency band and generate first channel state information corresponding to the first target frequency band. The first channel state information includes precoding matrix information.

At S2, the first communication node receives the first channel state information fed back by the second communication node.

The specific examples in the present embodiment may refer to the examples described in the above embodiments and alternative embodiments.

Figure 10:
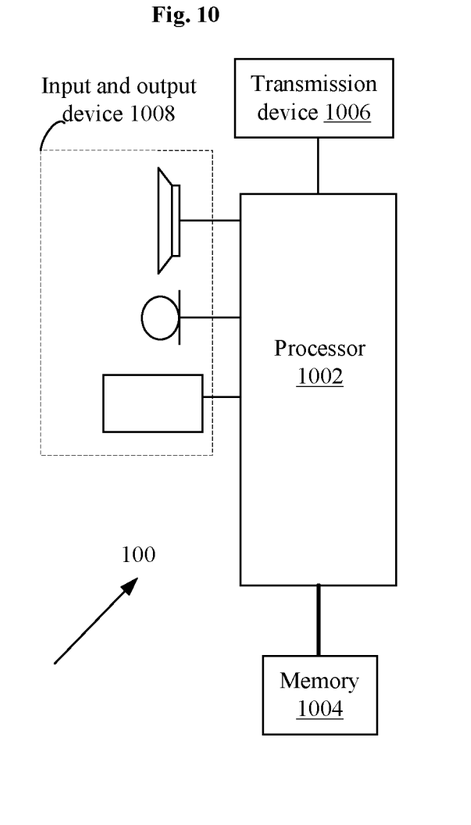
FIG. 10 is a structural block diagram of a hardware structure according to an embodiment of the present disclosure.

The method embodiment provided by the embodiments of the application may be performed in a mobile terminal, a computer terminal or similar operating devices. Taking running on a mobile terminal as an example, FIG. 10 is a structural block diagram of a hardware structure according to an embodiment of the present disclosure, which is applied to the storage medium and electronic device described above. As shown in FIG. 10, the hardware structure 100 may include one or more (only one is shown in FIG. 10) processors 1002 (the processors 1002 may include, but not limited to, a Micro Processor Unit (MCU) or a Field Programmable Gate Array (FPGA), and other processing devices), a memory 1004 configured to store data. Optionally, the mobile terminal may also include a transmission device 1006 with a communication function and an input and output device 1008. Those of ordinary skill in the art should know that the structure shown in FIG. 10 is only schematic and not intended to limit the structure of the mobile terminal. For example, the hardware structure 100 may also include more or less components than that in FIG. 1, or has a configuration different from that in FIG. 1.

The memory 1004 may be configured to store a computer program, for example, a software program and module of application software, for example, a computer program corresponding to the method in the embodiments of the present disclosure. The processor 1002 runs the computer program stored in the memory 1004, thereby executing various functional applications and data processing, namely implementing the above method. The memory 1004 may include a high-speed random access memory and may also include a nonvolatile memory, for example, one or more magnetic storage devices, flash memories or other nonvolatile solid-state memories. In some examples, the memory 1004 may include memories remotely set relative to the processor 1002, and these remote memories may be connected to the hardware structure 100 through the network. An example of the network includes, but not limited to, the Internet, an Intranet, a local area network, a mobile communication network and a combination thereof.

The transmission device 1006 is configured to receive or send data through a network. A specific example of the network may include a wireless network provided by a communication provider of the hardware structure 100. In an example, the transmission device 1006 includes a Network Interface Controller (NIC), which may be connected with other network devices through a base station, thereby communicating with the Internet. In an example, the transmission device 1006 may be a Radio Frequency (RF) module, which is configured to communicate with the Internet in a wireless manner.

It is apparent that those having ordinary skill in the art should appreciate that the above modules and operations of the present disclosure may be implemented by a general-purpose computing device, and they may be centralized in a single computing device or distributed on a network composed of multiple computing devices. As an exemplary implementation, they may be implemented by a program code which is capable of being executed by the computing device, so that they may be stored in a storage device and executed by the computing device; and in some situations, the presented or described operations may be executed in an order different from that described here; or they are made into integrated circuit modules, respectively; or multiple modules and operations of them are made into a single integrated circuit module to realize. Therefore, the disclosure is not limited to any particular combination of hardware and software.

What is claimed is:

1. A channel state information processing method, the method comprising:
   receiving, by a second communication node, configuration information sent by a first communication node, wherein the configuration information comprises: a target frequency band used for indicating channel state information;
   determining, by the second communication node, a first target frequency band according to the configuration information and generating, by the second communication node, first channel state information corresponding to the first target frequency band according to the configuration information, wherein the first channel state information is precoding matrix information, and the first target frequency band is a dedicated frequency band allocated to the precoding matrix information;
   determining, by the second communication node, a second target frequency band according to the configuration information and generating, by the second communication node, second channel state information corresponding to the second target frequency band according to the configuration information, wherein the second channel state information is channel quality indication information; and
   feeding back, by the second communication node, the channel state information to the first communication node, wherein the channel state information comprises the first channel state information and the second channel state information.

2. The method according to claim 1, wherein the configuration information further comprises preset position information; and
   the second communication node determines a position of at least one of the first target frequency band and the second target frequency band according to the preset position information.

3. The method according to claim 2, wherein the preset position information comprises at least one of the following: preset start position information and preset end position information;
   determining, by the second communication node, the position of at least one of the first target frequency band and the second target frequency band according to the preset position information comprises at least one of the following:

determining, by the second communication node, a start position of the first target frequency band or a start position of the second target frequency band according to the preset start position information; and determining, by the second communication node, an end position of the first target frequency band or an end position of the second target frequency band according to the preset end position information.

4. The method according to claim 1, wherein the first target frequency band is determined according to the second target frequency band in one of following manners:

the first target frequency band is equal to the second target frequency band;

the first target frequency band consists of the second target frequency band and a frequency band whose start position is lower than a start position of the second target frequency band;

the first target frequency band consists of the second target frequency band and a frequency band whose end position is higher than an end position of the second target frequency band;

the first target frequency band consists of the second target frequency band, a frequency band whose start position is lower than a start position of the second target frequency band, and a frequency band whose end position is higher than an end position of the second target frequency band;

the first target frequency band is equal to a frequency band crossed by the second target frequency band;

the first target frequency band consists of a frequency band crossed by the second target frequency band and a frequency band whose start position is lower than a start position of the second target frequency band;

the first target frequency band consists of a frequency band crossed by the second target frequency band and a frequency band whose end position is higher than an end position of the second target frequency band; and the first target frequency band consists of a frequency band crossed by the second target frequency band, a frequency band whose start position is lower than a start position of the second target frequency band, and a frequency band whose end position is higher than an end position of the second target frequency band.

5. The method according to claim 1, wherein determining, by the second communication node, the first target frequency band according to the configuration information comprises one of the following:

discontinuity of the second target frequency band in a frequency domain indicates that the first target frequency band comprises a frequency band crossed by the second target frequency band; or the first target frequency band comprises a frequency band crossed by the second target frequency band which is discontinuous in a frequency domain.

6. The method according to claim 1, wherein determining, by the second communication node, the first target frequency band according to the configuration information comprises:

determining, by the second communication node, the first target frequency band according to the second target frequency band and a bandwidth block, wherein the bandwidth block is a continuous frequency band in working carriers, and comprises the second target frequency band;

or, determining, by the second communication node, the first target frequency band according to a bandwidth of the second target frequency band and a bandwidth of a frequency band crossed by the second target frequency band.

7. The method according to claim 6, wherein determining, by the second communication node, the first target frequency band according to the second target frequency band and the bandwidth block comprises:

determining, by the second communication node, the first target frequency band according to a first bandwidth ratio of the second target frequency band to the bandwidth block;

and/or, determining, by the second communication node, the first target frequency band according to a first ratio of the bandwidth of the second target frequency band to a first threshold value and a second ratio of the bandwidth of the bandwidth block to a second threshold value.

8. The method according to claim 7, wherein determining, by the second communication node, the first target frequency band according to the first bandwidth ratio of the second target frequency band to the bandwidth block comprises one of the following:

in a case where the first bandwidth ratio is greater than or equal to a first preset ratio threshold, determining, by the second communication node, the first target frequency band according to a frequency band crossed by the second target frequency band; or in a case where the first bandwidth ratio is less than the first preset ratio threshold, determining, by the second communication node, the first target frequency band according to the second target frequency band, or determining, by the second communication node, the first target frequency band according to the number of resources fed back.

9. The method according to claim 6, wherein determining, by the second communication node, the first target frequency band according to the bandwidth of the second target frequency band and the bandwidth of the frequency band crossed by the second target frequency band comprises:

determining, by the second communication node, the first target frequency band according to a second bandwidth ratio of the bandwidth of the second target frequency band to the bandwidth of the frequency band crossed by the second target frequency band.

10. The method according to claim 9, wherein determining, by the second communication node, the first target frequency band according to the second bandwidth ratio of the bandwidth of the second target frequency band to the bandwidth of the frequency band crossed by the second target frequency band comprises one of the following:

in a case where the second bandwidth ratio is greater than or equal to a second preset ratio threshold, determining, by the second communication node, the first target frequency band according to the frequency band crossed by the second target frequency band; or in a case where the second bandwidth ratio is less than the second preset ratio threshold, determining, by the second communication node, the first target frequency band according to the second target frequency band, or determining, by the second communication node, the first target frequency band according to the number of resources fed back.

11. The method according to claim 6, wherein determining, by the second communication node, the first target frequency band according to the bandwidth of the second target frequency band and the bandwidth of the frequency band crossed by the second target frequency band comprises:

determining, by the second communication node, the first target frequency band according to a first size and a second size, wherein the first size is a size of a codebook vector determined according to the second target frequency band, and the second size is a size of a codebook vector determined according to the frequency band crossed by the second target frequency band.

12. The method according to claim 11, wherein determining, by the second communication node, the first target frequency band according to the first size and the second size comprises one of the following:

in a case where the first size is greater than or equal to the second size, determining, by the second communication node, that the first target frequency band is equal to the frequency band crossed by the second target frequency band; or  in a case where the first size is less than the second size, determining, by the second communication node, that the first target frequency band is equal to the second target frequency band.

13. The method according to claim 1, wherein generating, by the second communication node, the first channel state information corresponding to the first target frequency band comprises:

determining, by the second communication node, the first target frequency band according to indication information, wherein the indication information comprises at least one of the following:

first indication information used for indicating the first target frequency band by way of bit mapping, wherein a size of a frequency domain unit corresponding to each bit is indicated by a network side node;

second indication information used for indicating a start position and a bandwidth of the first target frequency band;

third indication information used for indicating a start position and an end position of the first target frequency band; and  fourth indication information used for indicating an end position and a bandwidth of the first target frequency band.

14. The method according to claim 1, wherein the configuration information further comprises determination indication information;

before determining, by the second communication node, the first target frequency band according to the configuration information, the method further comprises:

obtaining, by the second communication node, a way of determining the first target frequency band according to the determination indication information, wherein the determination indication information comprises one of the following:

determining the first target frequency band according to the second target frequency band; or  determining the first target frequency band according to a frequency band crossed by the second target frequency band.

15. The method according to claim 1, wherein the configuration information further comprises frequency band information of the second target frequency band; the frequency band information of the second target frequency band comprises at least one of the following:

a start position and a bandwidth of the second target frequency band;

an end position and a bandwidth of the second target frequency band;

a start position and an end position of the second target frequency band; and  continuity of the second target frequency band in a frequency domain.

16. The method according to claim 15, wherein determining, by the second communication node, the first target frequency band comprises: determining, by the second communication node, that the first target frequency band is equal to the second target frequency band according to the frequency band information of the second target frequency band.

17. An electronic device, comprising a memory and a processor, wherein the memory stores a computer program, and the processor is configured to run the computer program to execute the method according to claim 1.

18. A channel state information receiving method, the method comprising:

sending, by a first communication node, configuration information to a second communication node, wherein the configuration information comprises: a target frequency band used for indicating channel state information, wherein the configuration information is used for instructing the second communication node to determine a first target frequency band and generate first channel state information corresponding to the first target frequency band, and further used for instructing the second communication node to determine a second target frequency band and generate second channel state information corresponding to the second target frequency band, the first channel state information is precoding matrix information, the first target frequency band is a dedicated frequency band allocated to the precoding matrix information, and the second channel state information is channel quality indication information; and  receiving, by the first communication node, the channel state information fed back by the second communication node, wherein the channel state information comprises the first channel state information and the second channel state information.

19. An electronic device, comprising a memory and a processor, wherein the memory stores a computer program, and the processor is configured to run the computer program to execute the method according to claim 18.

\* \* \* \* \*